(12) United States Patent
Lee

(10) Patent No.: US 7,100,588 B2
(45) Date of Patent: Sep. 5, 2006

(54) DEVICE FOR HEIGHTENING ENGINE EFFICIENCY

(76) Inventor: Hsin-Chih Chung Lee, No. 21-8, Shang San Cho Woo, Wuchang-Li, Chungli City, Taoyuan Hsien (TW)

( * ) Notice: Subject to any disclaimer, the term of this patent is extended or adjusted under 35 U.S.C. 154(b) by 0 days.

(21) Appl. No.: 11/025,043

(22) Filed: Dec. 30, 2004

(65) Prior Publication Data

US 2006/0144377 A1 Jul. 6, 2006

(51) Int. Cl.
*F02B 77/00* (2006.01)
(52) U.S. Cl. ..................................... 123/585
(58) Field of Classification Search ............... 123/585, 123/586, 699, 700
See application file for complete search history.

(56) References Cited

U.S. PATENT DOCUMENTS

| | | | | | |
|---|---|---|---|---|---|
| 3,298,334 | A | * | 1/1967 | Holman | 123/531 |
| 3,561,412 | A | * | 2/1971 | Yagi et al. | 123/586 |
| 4,137,875 | A | * | 2/1979 | Medina | 123/585 |
| 4,148,285 | A | * | 4/1979 | Ahlers | 48/189.3 |
| 4,355,623 | A | * | 10/1982 | Graham | 123/585 |
| 5,046,475 | A | * | 9/1991 | Thompson | 123/585 |
| 5,269,283 | A | * | 12/1993 | Thompson | 123/585 |
| 5,307,771 | A | * | 5/1994 | Stahel et al. | 123/198 E |
| 6,769,396 | B1 | * | 8/2004 | Geyer et al. | 123/336 |
| 6,928,996 | B1 | * | 8/2005 | Tobinai | 123/586 |
| 2004/0250804 | A1 | * | 12/2004 | Young | 123/585 |

* cited by examiner

*Primary Examiner*—Stephen K. Cronin
*Assistant Examiner*—Jason Benton
(74) *Attorney, Agent, or Firm*—Rabin & Berdo, P.C.

(57) ABSTRACT

A device for heightening engine efficiency is provided with a heat-insulating seat of engine having a plurality of air inlets communicable with oil-gas inlets. The air inlets are provided with a valve, and the heat-insulating seat is provided with a cam mechanism, which is connected to a carburetor control device by means of an operation piece. When the carburetor is operated to drive the cam mechanism to open the valve such that fresh air is allowed to enter into the engine, and the combustion efficiency can be thus heightened. As soon as the accelerator is stopped, the valve is closed automatically.

8 Claims, 2 Drawing Sheets

DEVICE FOR HEIGHTENING ENGINE EFFICIENCY

BACKGROUND OF THE INVENTION

1. Field of the Invention

The present invention relates to engines, and particularly to a device for heightening engine efficiency of gardening tool machines.

2. The Prior Arts

As understood, some gardening tool machines comprise cutting tools that are operated by engines to prune plants.

An engine of gardening tool machine, just like a gasoline engine or a diesel engine applied in a vehicle, is empowered by combusting fuel to cause explosion and generate power to drive pistons reciprocally so that knife tools can be driven to do jobs. Therefore, air pollution is the same issue that must be considered.

SUMMARY OF THE INVENTION

For decreasing the quantity of exhaust gas discharged from the engine of a gardening tool machine, a better combustion efficiency of engine is pursued according to an aspect of the present invention.

Therefore, the primary object of the present invention is to introduce an air inhaler device into an engine structure by connecting the inhaler device with a carburetor control device. When the accelerator is driven to operate, extra fresh air will be guided into the engine to mix up with oil gas to promote the combustion inside the engine such that the discharge quantity of exhaust gas may be decreased.

In order to realize above object, a plurality of air inlets communicable with oil-gas inlets is arranged at a heat-insulating seat of engine. The air inlets are provided with a valve, and the heat-insulating seat is provided with a cam mechanism, which is connected to a carburetor control device by means of an operation piece. When the carburetor is operated to drive the cam mechanism to open the valve such that fresh air is allowed to enter into the engine, and the combustion efficiency can be thus heightened. As soon as the accelerator is stopped, the valve is closed automatically.

For more detailed information regarding advantages or features of the present invention, at least one example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
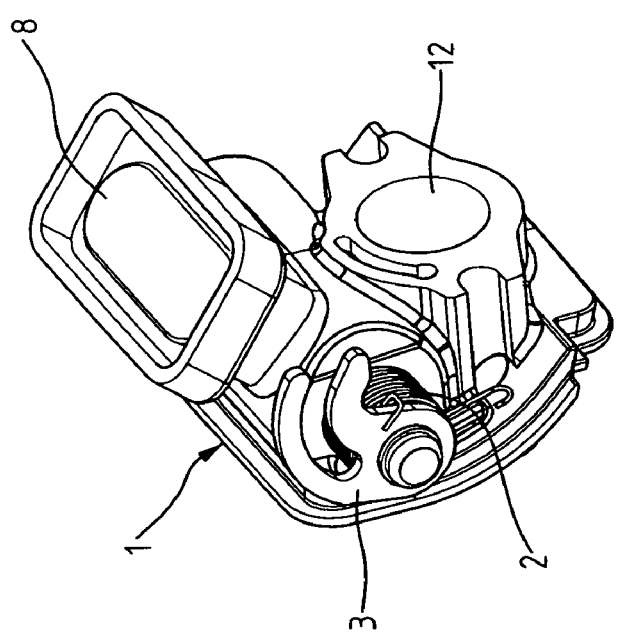
FIG. 1 is a perspective view of an embodiment of the present invention.
Figure 2:
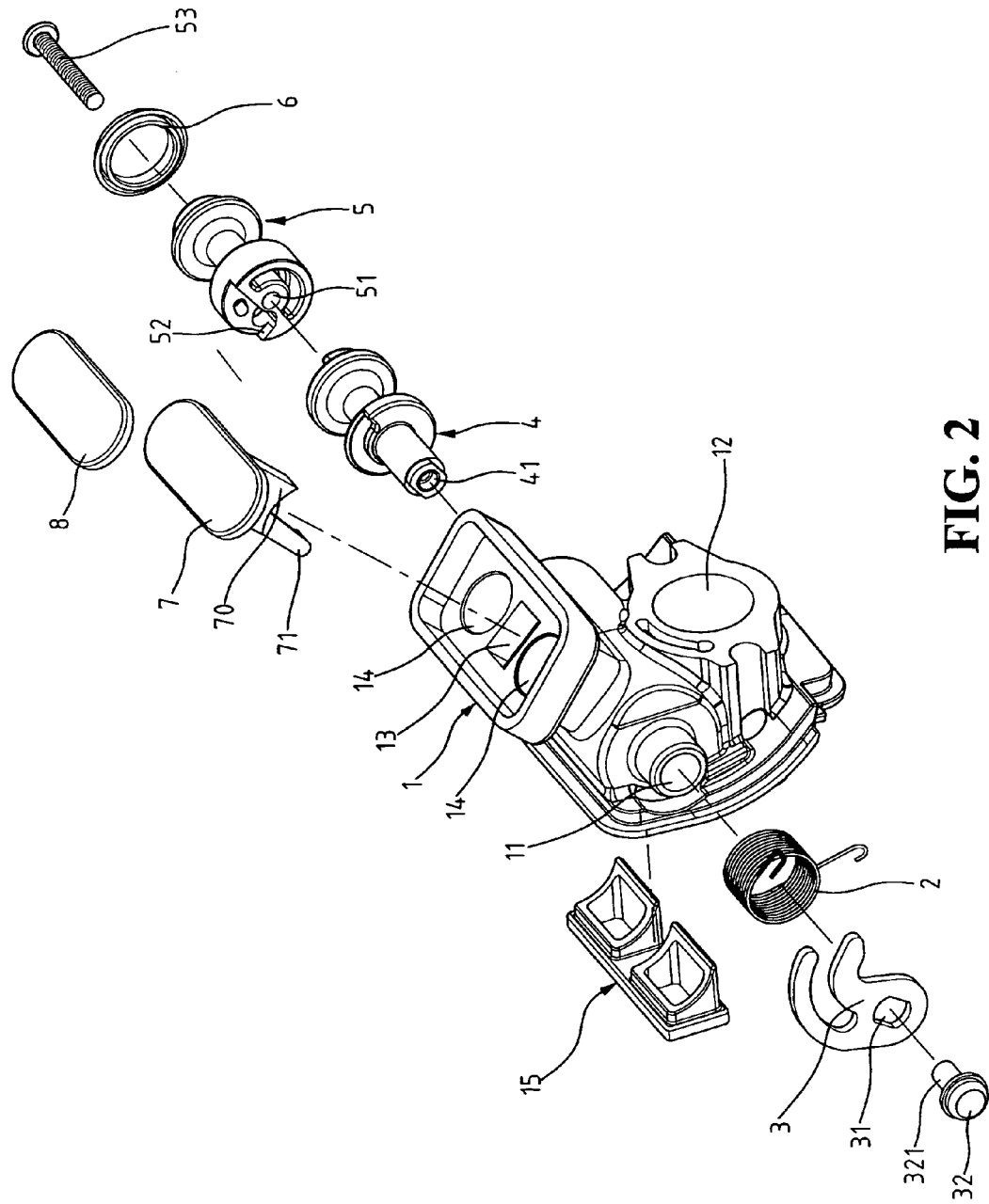
FIG. 2 is an exploded view showing main components of the embodiment of the present invention.

With reference to the drawings and in particular FIG. 2, a device for heightening engine efficiency in accordance with the present invention comprises a heat-insulating seat 1 fitted at an intake of an engine (not shown). The heat-insulating seat 1 forms a central hole 11 and an oil-gas inlet 12 on different sides thereof. The heat-insulating seat 1 also forms, on a top end thereof, an air inlet 14 in communication with the oil-gas inlet 12, where the amount of air inlet is decided on requirements, and in this case, two inlets are prepared. At a position between those two air inlets 14, a through hole 13 is perforated. Yet, on the other side of the heat-insulating seat 1 opposite to the oil-gas inlet 12, there is an oil-gas outlet (not shown) arranged to associate with a dust-and-leakage proof element 15 for being disposed at the mentioned intake of engine.

The embodiment of the present invention further provides a valve 7 and a cam mechanism. The valve 7 covers the area of all the air inlets 14 through and through, and extends downwardly to form a block body 70 and further a protruding portion 71, in which the outer measurements of the block body 70 are approximately equal to the inner measurements of the through hole 13, so that the block body 70 can be inserted in the through hole 13 and movable therein. Besides, as a dust-and-leakage proof element 8 is combined with the valve 7, therefore, air, fluid, or dust is prohibited from entering inside after the valve 7 is applied to cover the air inlets 14; and on the contrary, air is allowed to enter the heat-insulating seat 1 and accordingly inside the engine through the air inlets 14 after the valve 7 is opened.

An embodiment of the cam mechanism of the present invention is comprised of a rotation control plug 4, a transmission plug 5, a resilient element 2, and an operation piece 3, in which the rotation control plug 4 and the transmission plug 5 are made separately for the sake of easy making, though they can be made integrally. The rotation control plug 4 carries a tubular spindle having a spindle hole 41 penetrating therethrough. The transmission plug 5 is provided with a wheel body arranged at a spindle thereof, in which the wheel body is fitted with a cam-resembling protruding portion 52, as well as a spindle hole 51. The resilient element 2 is preferably a tension spring.

While assembling this mechanism, the procedure is supposed to: penetrate a bolt 53 in order through the spindle hole 51 of the transmission plug 5, then through the spindle hole 41 of the rotation control plug 4; put the rotation control plug 4 and the transmission plug 5 into the central hole 11 through one end of the heat-insulating seat 1; dispose the resilient element 2, the operation piece 3, and a plug spindle 32 in order at the other end of the heat-insulating seat 1, such that, after the plug spindle 32 penetrates through a through hole 31 of the operation piece 3 and the resilient element 2, the bolt 53 can be locked in a screw hole 321 formed at one end of the plug spindle 32 to thereby further fix the rotation control plug 4, the transmission plug 5, and the operation piece 3 together, while two ends of the resilient element 2 are hooked respectively at a proper position on the operation piece 3 and the heat-insulating seat 1; and finally, sheathe the heat-insulating seat 1 at a position adjacent the central hole 11 thereof in the dust-and-leakage proof element 15 to prevent dust from entering into the heat-insulating seat or the fluid in the heat-insulating seat from leaking away.

The operation piece 3 may be connected to the carburetor control device (not shown) of engine by means of a link or rope. When the carburetor is driven, through the link or rope, the operation piece 3 is rotated to compress the resilient element 2 to drive the transmission plug 5 to rotate such that the protruding portion 52 of the wheel body would act on the protruding portion 71 of the valve 7 accordingly to hence jack the valve 7 up to clear the choke on the air inlets 14 for introducing the outside air into the heat-insulating seat 1 through the air inlets 14, and the introduced air flow is then mixed up with the oil gas come from the oil-gas inlet 12 and guided into the engine for a better combustion to hence decrease the discharge quantity of exhaust gas of incomplete combustion. When the accelerator pedal is released to stop the operation of the carburetor, the operation piece 3 and the transmission plug 5 are restored to their original positions by means of the elastic force of the resilient element 2.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A device for heightening engine efficiency, comprising a heat-insulating seat that forms air inlets in communication with oil-gas inlets, a valve being provided to the air inlets and a cam mechanism provided to the heat-insulating seat, the cam mechanism being connected with a carburetor device such that the air inlets are interacted to be opened or closed by mean of the valve according to the cam mechanism controlled by the carburetor control device, wherein the cam mechanism comprises:

a transmission plug and a rotation control plug, which are connected in series and fixed on a single spindle, wherein the transmission plug has a protruding portion for contact with a protruding portion of the valve; the rotation control plug is coupled with an operation piece and a resilient element is disposed between the operation piece and the heat-insulating seat; and the operation piece is also in connection with the carburetor control device.

2. The device as claimed in claim 1, wherein the heat-insulating seat has a through hole, the valve having a movable block body assembled in the through hole, the block body having a protruding portion contactable with the cam mechanism.

3. The device as claimed in claim 1, wherein the heat-insulating seat has two air-inlets.

4. The device as claimed in claim 1, wherein the resilient element is a tension spring penetrated by the rotation control plug such that two ends of the tension spring are fixed to the operation piece and the heat-insulating seat, respectively.

5. A device for improving engine efficiency, comprising:

a heat-insulating seat that has an air inlet and an oil-gas inlet formed therein, the air inlet being in communication with the oil-gas inlet;

a valve that is movable to open and close the air inlet, and having a protruding portion; and a cam mechanism disposed in the heat-insulating seat, and being connectable to a carburetor control device to be controlled thereby, and including an operation piece connectable to the carburetor control device;

a resilient element disposed between the operation piece and said heat-insulating seat;

a transmission plug having a protruding portion that contacts the protruding portion of said valve; and a rotation control plug coupled with the operation piece, said transmission plug and said rotation control plug being connected in series and being fixed on a single spindle.

6. The device as claimed in claim 5, wherein the heat-insulating seat has a through hole, the valve having a movable block body disposed in the through hole, the block body having the protruding portion contactable with the protruding portion of the transmission plug.

7. The device as claimed in claim 5, wherein the heat-insulating seat has two of the air-inlets.

8. The device as claimed in claim 5, wherein the resilient element is a tension spring penetrated by the rotation control plug such that two ends of the tension spring are fixed to the operation piece and the heat-insulating seat, respectively.

* * * * *